Dec. 3, 1968   A. D. STROMMEN   3,414,139
BALE HOLDER

Filed Dec. 13, 1965   2 Sheets-Sheet 1

INVENTOR.
ANDROS D. STROMMEN
BY
Williamson & Palmatier
ATTORNEYS

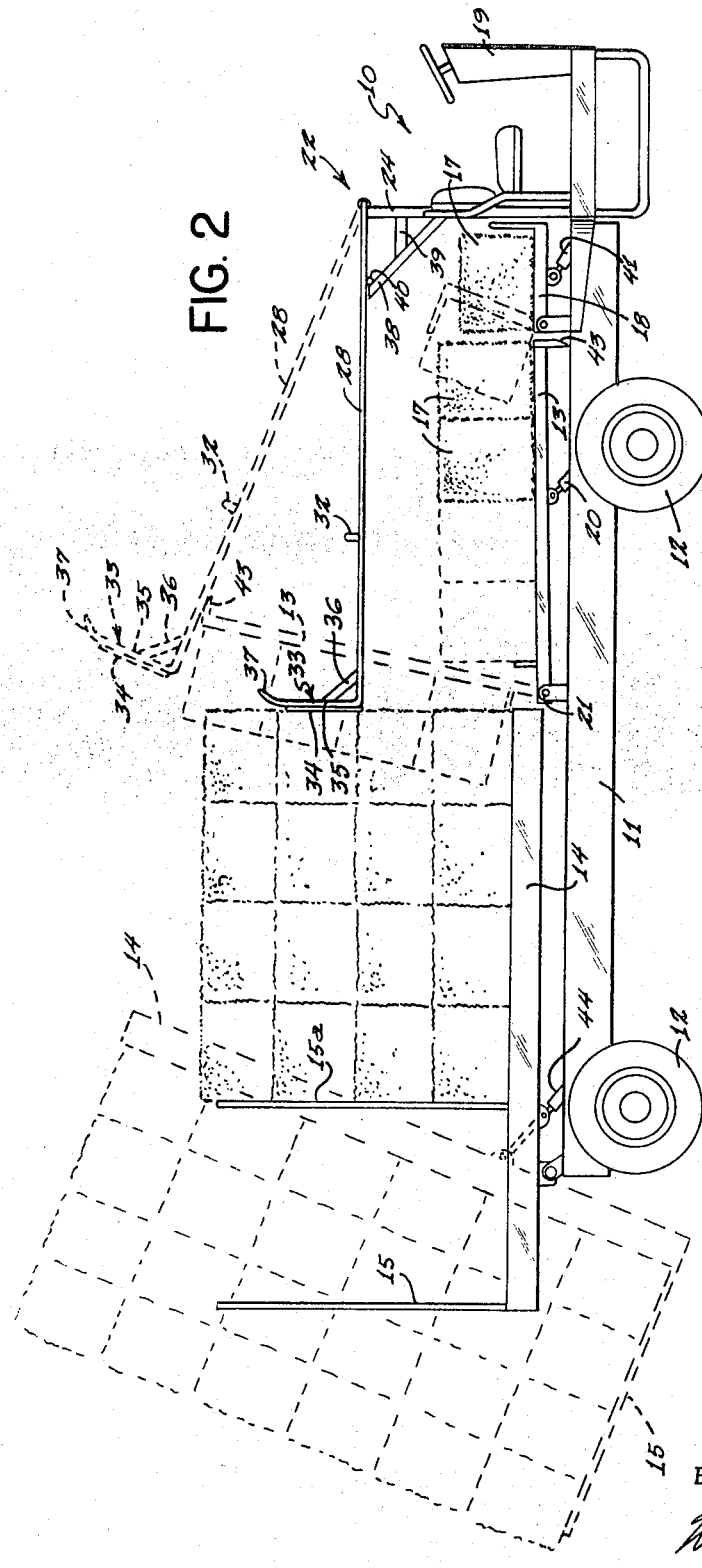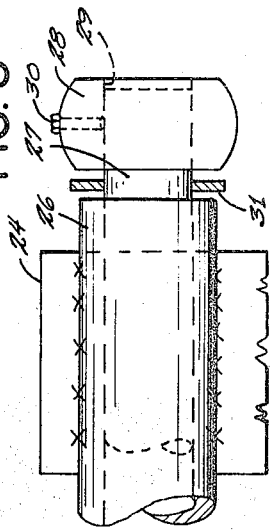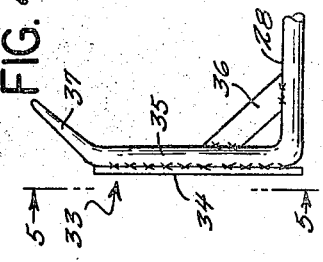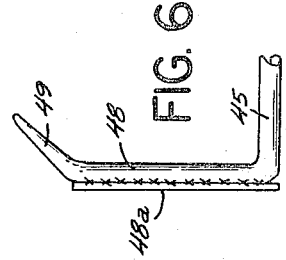
INVENTOR.
ANDREAS D. STROMMEN
BY
Williamson & Palmatier
ATTORNEYS

United States Patent Office 3,414,139
Patented Dec. 3, 1968

3,414,139
BALE HOLDER
Andros D. Strommen, Vandalia, Mont. 59273
Filed Dec. 13, 1965, Ser. No. 513,471
5 Claims. (Cl. 214—6)

ABSTRACT OF THE DISCLOSURE

A bale-stack holder and stabilizer with actuating mechanism adapted to be attached to a bale wagon or the like to prevent buckling of a stack of bales during transport operations, which is combined in operation with a transverse bed tiltable about a transverse axis adjacent its rear end and with a load-carrying bed arranged rearwardly of the bale wagon frame to receive tiers of bales from the transverse bed. Those improvements which essentially embody a substantially rigid, elongate member pivotally mounted at one of its ends to the bale wagon frame in a position generally forwardly of the transverse bed and with means through contact of the elongate member with intermediate bales of a stack or the load-carrying bed to cause the member to pivot, swing and permit clearance when bales are transferred to the load-carrying bed from the transverse bed, and with simple means for automatically positioning the free end of the elongate member in contact with intermediate tiers of bales of a stack on the load-carrying bed.

This invention relates to a bale holder for bale wagons and more particularly relates to a bale holder adapted to prevent stacked bales from buckling when transported over uneven ground.

In bale wagons which are presently available provision is not made for retaining the middle bales in an upright stack even though provision may be made to retain the topmost bales from falling forwardly or rearwardly. An example of a typical bale wagon may be found in U.S. Patent No. 2,848,127 entitled Bale Wagon and issued Aug. 19, 1958 to Gordon E. Grey. It has been found that when driving over rough or uneven surfaces, typical of that which may be found in a field at baling time, the baled products stacked on the bale wagon load-carrying bed have a tendency to buckle at the middle bales and slip out, thereby destroying the stack and causing considerable inconvenience. Although presently available bale wagons may provide mechanisms to maintain the topmost bales in a predetermined position on the load-carrying bed of the bale wagon, provision is not made to retain the middle bales from lurching or buckling forwardly as the stack is jostled over uneven terrain.

With these comments in mind, it is to the elimination of these and other disadvantages to which the present invention is directed, along with the inclusion therein of other novel and desirable features.

An object of my invention is to provide a new and improved bale holder of simple and inexpensive construction and operation.

Another object of my invention is the provision of a bale holder which prevents the middle bales in a stack of bales from buckling in transport.

Another object of my invention is the provision of a bale holder which needs no machinery in its operation but relies on operating parts of the bale wagon to properly position the bale holder.

A further object is the provision of a bale holder which may be quickly and efficiently assembled to a bale wagon.

These and other objects and advantages of my invention will more fully appear from the following description made in connection with the accompanying drawings wherein like reference characters refer to the same or similar parts throughout the several views, and in which:

FIG. 2 is a side view of a bale wagon showing my bale holder engaging the middle bales of a stack of bales on the load-carrying bed and, in dotted lines, showing the transfer bed positioning the bale holder to allow transfer of subsequent bales to the load-carrying bed.

FIG. 3 is an enlarged, fragmentary view taken at the line 3—3 of FIG. 1.

FIG. 4 is an enlarged fragmentary view taken at the line 4—4 of FIG. 1.

FIG. 5 is an enlarged end view taken along the line 5—5 of FIG. 4.

FIG. 6 is a side view of a modified bale engaging element.

Figure 1:
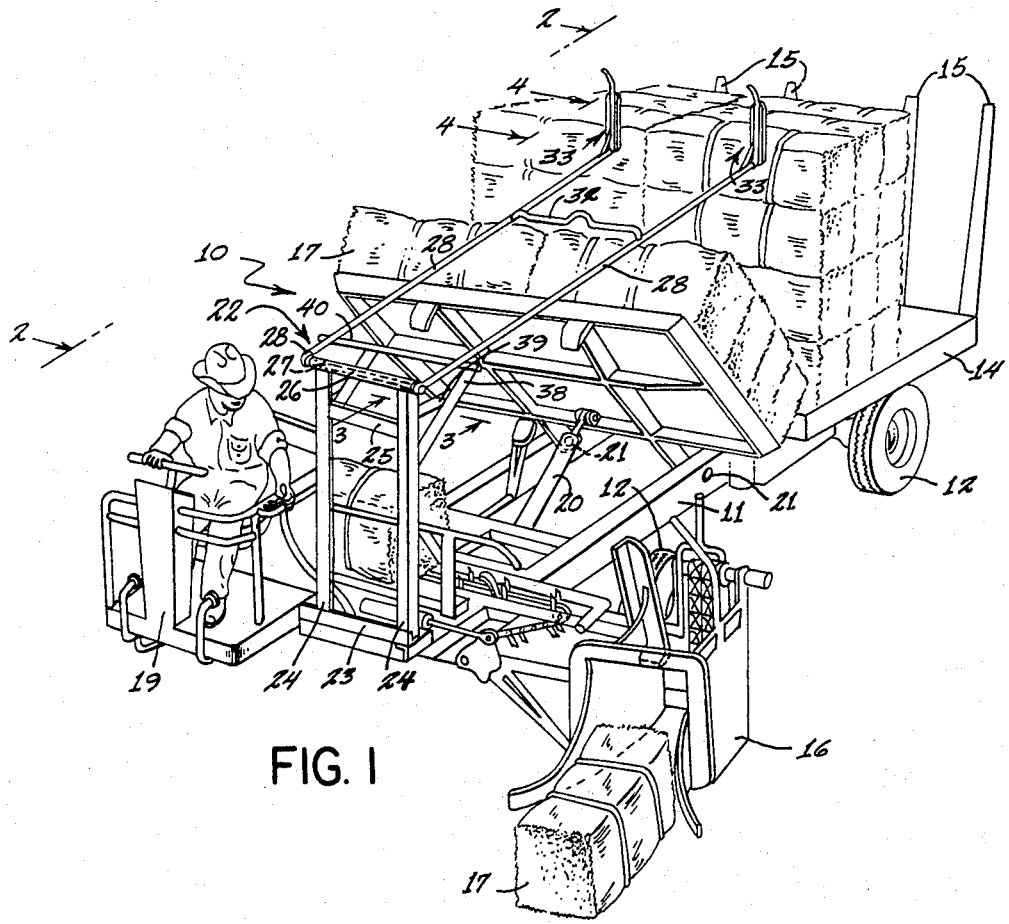
FIG. 1 is a perspective view of a bale wagon in operation showing my bale holder being actuated by the transfer bed of the bale wagon.

Referring to FIG. 1, a bale wagon is shown in operating position and is indicated by numeral 10. The bale wagon comprises a frame 11 having wheels 12 rotatably mounted thereon, a bale transfer bed 13 and a load carrying bed 14 having upright slats 15 and 15a. A bale loader unit 16 is shown attached to frame 11 receiving a bale 17 to be loaded upon receiving bed 18 which is also mounted on frame 11. An operator's platform is indicated at 19 and extends from the frame 11. A hydraulic ram 20 is mounted on frame 11 and attached to transfer bed 13 providing upward movement of the transfer bed 13 about the transverse pivot point 21. This upward movement of transfer bed 13 moves bales 17 into an upright stack on load-carrying bed 14.

The bale holder of my invention is shown mounted on bale wagon frame 11, and is indicated in general at numeral 22 of FIG. 1. The bale holder is shown as it is moved upwardly by transfer bed 13 which bed is actuated by ram 20. This action moves the bale holder 22 from bale engaging position upwardly, providing room for additional bales on the load carrying bed 14. The bale holder is constructed from standard steel angles of suitable weight and from steel tubing of suitable diameter. The bale holder includes a base 23, shown in FIG. 1 mounted on frame 11. The base 23 may be welded or bolted to the frame 11. An upright supporting structure comprises a pair of upright members 24 attached to base 23, generally by welding, which members 24 are constructed from angle iron and extend upwardly about 5'0" from the base 23. A cross member 25 may be provided for additional stability. Tube 26 is welded to upright members 24, at the top thereof, substantially parallel to the ground and transversely to the direction of travel of the bale wagon 10. A shaft 27 turns inside tube 26 and projects, at each end, outwardly therefrom. A pair of elongate rods 28, constructed from rigid metal tubing, are mounted on shaft 27.

Referring to FIG. 3, a detail of this construction is shown with one of the rods 28 having an aperture 29 with an internal diameter approximating the outer diameter of shaft 27. Set screw 30 secures rod 28 to shaft 27. A washer 31 separates the rotatable rod element 28 from the stationary tube element 26 within which shaft 27 rotates.

As shown in FIG. 1, a brace 32 is included interconnecting rods 28 to provide additional stability to the rods. Bale engaging elements 33 are provided at the end of rods 28. Referring to FIG. 4, a bale engaging element 33 is shown having a bale engaging plate 34 welded to the upright portion 35. Additional bracing 36 may be welded between the elongate rod portion 28 and the upright portion 35. To provide against the upper portion of element 33 engaging a bale as rods 28 are raised, the upper portion of the bale engaging element 33 is bent forwardly toward the direction of travel of the bale wagon and away from the stack bales. This upper portion is indicated in general by numeral 37.

Referring to FIG. 2, a pair of rod positioning braces 38 are welded to uprights 24 and extend rearwardly and upwardly therefrom. Additional bracing struts 39 interconnects uprights 24 and braces 38 are welded thereto. A transverse rod stop element 40 is welded across the pair of rod positioning braces 38 at the upper end thereof.

Receiving bed 18 is shown in FIG. 2 receiving a bale 17. Ram 41 raises receiving bed 18 into the position as shown in the dotted lines in FIG. 2. This deposits the bale on its edge on the transfer bed 13. Ram 20 operates the transfer bed from a generally horizontal position to a generally upright position as indicated by the dotted line. A rod contacting support 43 is shown on the forward edge of the transfer bed and extending downwardly when the transfer bed is in the horizontal position. Support 43 is a steel plate welded to the transfer bed and may be covered with a cushion material such as rubber. Ram 44 raises the load carrying bed 14 from a generally horizontal position to a generally upright position from which the bale stack may be removed. The tilted position of the load carrying bed 14 is shown in dotted lines in FIG. 2.

Figure 7:
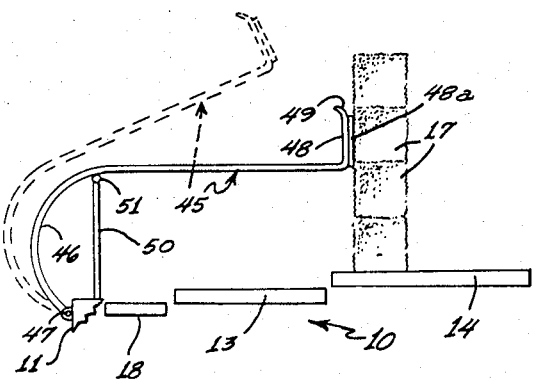
FIG. 7 is a diagrammatic side view of an alternate form of my bale holder.

An alternate form of my invention is shown in FIGS. 6 and 7. The bale holder of my invention may be attached directly to the frame 11 and pivoted at the point of connection. As shown in FIG. 7, the holder rod elements are indicated at numeral 45 having a rounded portion 46 pivotally attached to the frame 11 at 47. Elongate rods 45 extended rearwardly of the bale wagon 10 contacting the bales 17 at a predetermined position. The bale engaging upright portion 48 is bent from the bale holder and extends upwardly therefrom. A steel facing 48a may be welded to upright 48. To avoid piercing or upsetting the stacked bales, upright 48 has a portion 49 bent forwardly in the direction of travel of the bale wagon providing clearance in upward movement of bale holder to avoid engaging bales. A stop or positioning assembly 50 is shown attached to frame 11 extending upright therefrom with a rod engaging element 51 welded transversely thereto and located to contact rods 44.

*Operation*

The operation of my bale holder is best described by referring to FIG. 2. A bale 17 is shown in position on receiving bed 18. As shown in the dotted lines, receiving bed 18 is tilted by ram 41 along a transverse pivot point turning the bale 17 through 90 degrees and depositing it on the transfer bed 13. As successive bales 17 are placed on transfer bed 13, the bales are moved rearwardly until such time as the transfer bed is at full capacity. The operator then actuates ram 20 which rotates the bales from a generally horizontal position to a generally upright position in dotted lines and deposits them on the load carrying bed 14.

My bale holder is shown in FIG. 2 contacting bales on the load carrying bed 14. The middle bales, rather than the topmost bales, are contacted to prevent buckling forwardly of the middle bales. As bed transfer 13 is raised through 90 degrees, utilizing ram 20, the bales are placed on the load carrying bed 14 and simultaneously the bales on the transfer bed contact rods 28 and lifts rods 28 upwardly about transverse shaft 27. When the bales from the transfer bed 13 are deposited on the load carrying bed 14, the rod elements 32 typically contact rod engaging plates 43 maintaining the position of the bale holder out of the way of the transfer operation. The position of the bales and the bale holder at the time of transfer is shown in the dotted lines in FIG. 2. At this point the bale holder is not functioining and is only being displaced to provide normal transfer of the bales. As the ram 20 returns transfer bed 13 to its normal horizontal position, rod elements 28 are allowed to pivot downwardly about transverse shaft 27 until such time as rods 28 contact the transverse stop 40 which prevents further drop of the rods. At this predetermined point, rods 28 project generally horizontally rearwardly of the direction of the travel of the bale wagon and allow the bale engaging elements 33 to contact the approximate middle bales in the stack of bales which were transferred from the transfer bed to the load carrying bed. This function, of course, is carried out without the need for any separate motors or controls. The normal movement of the transfer bed forces the bale holder from contact with the bales and out of the way of the bale stacking operation as well as allowing it to return to position to engage and support the middle bales. Upright slats 15a engage and support the bales on the load-carrying bed and move rearwardly as more bales are placed on the load carrying bed maintaining the supporting relation to the bales.

The alternate form of my invention operates under the same principle but is simply pivoted at the bale wagon frame rather than approximately 5 ft. above the frame. The engaging rods, however, are lifted out of the way in the same manner by transfer bed 13.

It will, of course, be understood that various changes may be made in the form, details, arrangement and proportions of the various parts without departing from the scope of my invention.

What is claimed is:

1. A bale stack holder adapted to be attached to a bale wagon to prevent buckling of a stack during transport, the bale wagon having a transfer bed tiltable about a transverse axis adjacent its rear end and a load-carrying bed arranged rearwardly on a bale wagon frame, said bale holder comprising, a substantially rigid elongate member pivotally mounted adjacent one end thereof to the bale wagon frame, generally forwardly of the transfer bed, means pivoting said elongate member to permit clearance when transferring bales to the load-carrying bed, means actuated by the tilting of said transfer bed to simultaneously elevate said member for clearance, and means positioning the free end of said elongate member in contact with intermediate bales of a stack on the load-carrying bed of the bale wagon upon return of the member to its normal position.

2. The bale stack holder of claim 1 wherein said elongate member is swung upwardly by the transfer bed as the transfer bed is tilted about its transverse axis.

3. The bale stack holder of claim 1, wherein the positioning means comprises an upright support frame at a predetermined height affixed to the bale wagon frame to cause positioning of the rear end of said elongate member in contact with predetermined intermediate bales stacked on the load-carrying bed of the bale wagon.

4. A bale stack holder adapted to be attached to a bale wagon to prevent buckling of a stack during transport, the bale wagon having a receiving bed, a transfer bed tiltable about a transverse axis adjacent its rear end, and a load-carrying bed arranged rearwardly on a bale wagon frame, said holder comprising, an upright stack holder support frame affixed to the bale wagon frame generally forwardly of the transfer bed, at least one elongate rod pivotally mounted on its forward end thereof on said upright bale holder support frame and on the other end thereof having a transverse bale engaging element, said other end overhanging said transfer bed, said elongate rod adapted to be pivoted by the tiltable transfer bed to permit clearance when transferring bales from the receiving bed to the load-carrying bed, and an elongate rod positioning assembly affixed to said upright bale holder support frame and projecting generally rearwardly therefrom, said positioning assembly adapted to contact said elongate rod to by gravity cause positioning of said bale engaging element in contact with predetermined intermediate bales of the stack on the load-carrying bed of the bale wagon.

5. The bale stack holder of claim 4 wherein a pair of elongate rods are pivotally mounted on said upright bale holder support frame, each of said elongate rods having a bale engaging element including an upright portion and an upper portion integral with said upright portion, said upper portion bent forwardly to permit clearance of the bale engaging element when transferring bales from the transfer bed to the load-carrying bed.

References Cited

UNITED STATES PATENTS

| | | | |
|---|---|---|---|
| Re. 25,750 | 3/1965 | Adams et al. | 214—6 |
| 987,185 | 3/1911 | Steedman | 214—7 |
| 2,328,635 | 9/1943 | Fisk | 214—7 |
| 2,328,923 | 9/1943 | Peterson et al. | 214—7 |
| 2,848,127 | 8/1958 | Grey | 214—6 |
| 3,278,049 | 10/1966 | Hollyday | 214—6 |
| 3,278,050 | 10/1966 | Tarbox | 214—6 |
| 3,289,859 | 12/1966 | Tarbox | 214—6 |

ROBERT G. SHERIDAN, *Primary Examiner.*

GEORGE F. ABRAHAM, *Assistant Examiner.*